United States Patent
Kniaz

(10) Patent No.: US 8,799,078 B1
(45) Date of Patent: Aug. 5, 2014

(54) ADVERTISING VALUE TOOLS

(75) Inventor: Robert Kniaz, San Francisco, CA (US)

(73) Assignee: Google Inc., Mountain View, CA (US)

( * ) Notice: Subject to any disclaimer, the term of this patent is extended or adjusted under 35 U.S.C. 154(b) by 535 days.

(21) Appl. No.: 12/607,517

(22) Filed: Oct. 28, 2009

Related U.S. Application Data

(60) Provisional application No. 61/109,734, filed on Oct. 30, 2008.

(51) Int. Cl.
*G06Q 30/00* (2012.01)

(52) U.S. Cl.
USPC ............ 705/14.69; 705/14.4; 705/14.43; 705/14.46; 705/14.71; 705/14.73; 705/14.48

(58) Field of Classification Search
CPC ................................. G06Q 30/0244
See application file for complete search history.

(56) References Cited

U.S. PATENT DOCUMENTS

| | | | | |
|---|---|---|---|---|
| 6,178,228 B1 * | 1/2001 | Schol | | 378/162 |
| 6,684,190 B1 * | 1/2004 | Powers et al. | | 705/36 R |
| 7,072,863 B1 * | 7/2006 | Phillips et al. | | 705/36 R |
| 7,775,257 B2 * | 8/2010 | Khan et al. | | 164/136 |
| 7,788,159 B1 * | 8/2010 | Sack | | 705/37 |
| 2004/0064283 A1 * | 4/2004 | Preiksas et al. | | 702/107 |
| 2004/0093296 A1 * | 5/2004 | Phelan et al. | | 705/36 |
| 2005/0171844 A1 * | 8/2005 | Ferber et al. | | 705/14 |
| 2006/0026063 A1 * | 2/2006 | Collins | | 705/14 |
| 2006/0282328 A1 * | 12/2006 | Gerace et al. | | 705/14 |
| 2007/0205276 A1 * | 9/2007 | Sodan et al. | | 235/383 |
| 2008/0015870 A1 * | 1/2008 | Elowitz et al. | | 705/1 |
| 2008/0082400 A1 * | 4/2008 | Martel et al. | | 705/10 |
| 2008/0097829 A1 * | 4/2008 | Ritter | | 705/10 |
| 2008/0097929 A1 * | 4/2008 | Hodges et al. | | 705/80 |
| 2008/0275757 A1 * | 11/2008 | Sharma et al. | | 705/10 |
| 2008/0275770 A1 * | 11/2008 | Kitts | | 705/14 |

* cited by examiner

*Primary Examiner* — John G Weiss
*Assistant Examiner* — Vincent Cao
(74) *Attorney, Agent, or Firm* — Fish & Richardson P.C.

(57) ABSTRACT

Methods, systems, and apparatus, including computer program products, that generate a display including one or more user-adjustable advertising mechanisms and receive a user selection of at least one of the one or more user-adjustable advertising mechanisms. Optionally, a user-adjustable tool can be displayed. The user-adjustable tool is configurable by the user to adjust the at least one user-adjustable advertising mechanism. A graphic is generated that represents at least one other user-adjustable advertising mechanism, where the graphic is generated based at least in part on the adjustment of the at least one user-adjustable advertising mechanism using the user-adjustable tool.

16 Claims, 7 Drawing Sheets

ADVERTISING VALUE TOOLS

BACKGROUND

A web publisher is an entity, such as person or an enterprise, that hosts web pages or websites that can be accessed over a network, such as the Internet. The publisher can monitor analytical data related to user visits and links to the publisher's web pages or websites. Example analytical data includes data related to domains and/or websites from which visitors arrived and to which the visitors departed; data related to keywords, e.g., search queries, that permitted identification of the publisher's web pages or websites; traffic patterns, e.g., navigation clicks, of visitors within the publisher's website; visitor actions, e.g., purchases, filling out of forms, etc. and other actions that a visitor may take in relation to the publisher's website.

The analysis of such analytical data can, for example, inform the publisher of how visitors found the publisher's website and how the visitors interacted with the publisher's website. With this understanding, the publisher can implement changes to increase revenue generation and/or improve the visitor experience. For example, a publisher can focus marketing resources on advertising campaigns, identify keywords that increase the likelihood that a user will visit the publisher's web site or web pages, identify the best location to place ads to increase revenue, identify other publishers as potential partners for cross-linking, and the like.

Determining the value derived from advertising campaigns can be challenging for a publisher to understand. For instance, the interaction of different advertising mechanisms, such as ad impressions, click-throughs, conversions, and the like, may be interdependent but conventional advertising mechanisms may not provide publishers with simple and intuitive methods to view such interdependencies such that the advertiser can adjust an advertising campaign as necessary to achieve desired results.

SUMMARY

In general, one aspect of the subject matter described in this specification can be embodied in a methods including the actions of generating a display including one or more user-adjustable advertising mechanisms, receiving a user selection of at least one of the one or more user-adjustable advertising mechanisms, displaying a user-adjustable tool, the user-adjustable tool configurable by the user to adjust the at least one user-adjustable advertising mechanism, and generating a graphic representing at least one other user-adjustable advertising mechanism based at least in part on an adjustment of the at least one user-adjustable advertising mechanism by the user using the user-adjustable tool.

One or more of the following features can be included. The user-adjustable tool can include a slider tool. The one or more user-adjustable advertising mechanisms can include advertising impressions, advertising clicks, and/or conversions. According to another feature, generating the graphic can include generating at least one graph. The at least one graph can include a yield curve. According to yet another feature, the method can include displaying a cost associated with the at least one of the one or more user-adjustable advertising mechanisms. The method can also include displaying the graphic on a display associated with the user.

These general and specific aspects may be implemented using a system, a method, or a computer program, or any combination of systems, methods, and computer programs.

Aspects of the invention can include none, one or more of the following advantages. An intuitive graphical user interface can be presented that provides publishers with feedback to implement changes to increase revenue generation.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The present disclosure now will be described more fully hereinafter with reference to the accompanying drawings, in which some, but not all implementations are shown. Indeed, these implementations can be embodied in many different forms and should not be construed as limited to the implementations set forth herein; rather, these implementations are provided so that this disclosure will satisfy applicable legal requirements. Like numbers refer to like elements throughout.

The present disclosure describes an advertising system that provides feedback via user interfaces. In particular, the user interfaces provide one or more user-adjustable tools, such as slider bars, that show the interrelation of user-configurable advertising mechanisms. Users can use the tools to view how adjustments to one or more advertising mechanisms impacts the placement of content items (e.g., advertisements or "ads") on one or more web pages. The interfaces can permit, e.g., a publisher to modify bids for advertising placements, keywords, and/or advertisements to obtain a better return on investment. While reference is made to content placement on the web, other forms of content (text, graphics, audio, video, etc.) and other distribution mediums are possible (print, radio, television, broadcast, etc.).

Figure 1:
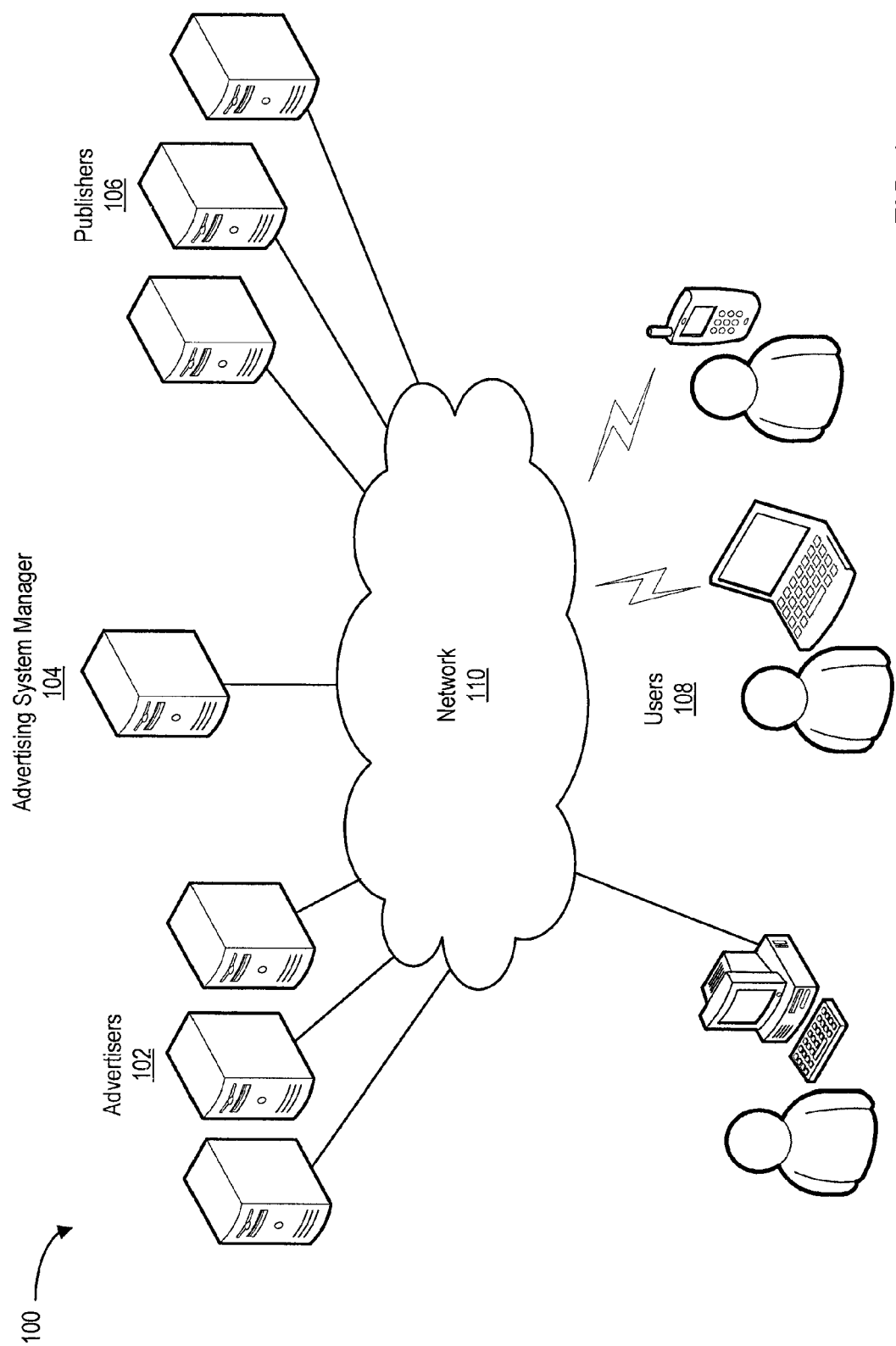
FIG. 1 is a block diagram of an example online advertising system.

FIG. 1 is a block diagram of an example online advertising system 100. In some implementations, one or more advertisers 102 can directly or indirectly enter, maintain, and track advertisement ("ad") information using an advertising system manager 104. The ads may be in the form of graphical ads, such as banner ads, text only ads, image ads, audio ads, video ads, ads combining one of more of any of such components, etc. The ads may also include embedded information, such as a links, meta-information, and/or machine executable instructions. One or more publishers 106 may submit requests for ads to the system manager 104. The system manager 104 responds by sending ads (either to the requesting publisher 106 or a viewer associated with a user 108 accessing the web property) for placement on one or more of the publisher's web properties (e.g., websites and other network-distributed content).

Other entities, such as users 108 and the advertisers 102, can provide usage information to the system manager 104, such as, for example, whether or not a conversion or click-through related to an ad has occurred. This usage information can include measured or observed user behavior related to ads that have been served. The system manager 104 performs financial transactions, such as crediting the publishers 106 and charging the advertisers 102 based on the usage information.

A computer network 110, such as a local area network (LAN), wide area network (WAN), the Internet, or a combination thereof, connects the advertisers 102, the system manager 104, the publishers 106, and the users 108.

One example of a publisher 106 is a general content server that receives requests for content (e.g., articles, discussion threads, music, video, graphics, search results, web page listings, information feeds, etc.), and retrieves the requested content in response to the request. The content server may submit a request for content, e.g., ads, to a content server in the system 100. In some implementations the system manager 104 can include a content server. The content request may include, e.g., a number of ads desired. The content request may also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more other content, e.g., ads, provided by the ad system manager 104. This combined content can be sent to the user 108 that requested the content for presentation in a viewer (e.g., a browser or other content display/presentation system). The content server can transmit information about the content, e.g., ads, back to the content server, including information describing how, when, and/or where the ads are to be rendered (e.g., in HTML or JavaScript™). Alternatively, the ads can be served directly to a user coincident with the rendering of content from the content server.

Another example publisher 106 is a search service. A search service can receive queries for search results. In response, the search service can retrieve relevant search results from an index of documents (e.g., from an index of web pages). An exemplary search service is described in the article S. Brin and L. Page, "The Anatomy of a Large-Scale Hypertextual Search Engine," Seventh International World Wide Web Conference, Brisbane, Australia and in U.S. Pat. No. 6,285,999, both of which are incorporated herein by reference each in their entirety. Search results can include, for example, lists of web page titles, snippets of text extracted from those web pages, and hypertext links to those web pages, and may be grouped into a predetermined number of (e.g., ten) search results.

The search service can submit a request for content, e.g., ads, to the ad system manager 104. For instance, the request may include a number of ads desired. This number may depend on the search results, the amount of screen or page space occupied by the search results, the size and shape of the ads, etc. In some implementations, the number of desired ads will be from one to ten, or from three to five. The request for ads may also include the keyword, or query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search service can combine the search results with content, e.g., one or more of ads provided by the ad system manager 104. This combined content can then be forwarded to the user 108 that requested the content. Alternatively, the search results can be separately served to the end user. Search results can be maintained as distinct from the ads, so as not to confuse the user between paid advertisements and presumably neutral search results. Finally, the search service can transmit information about the ad and when, where, and/or how the ad was to be rendered back to the ad system manager 104.

As can be appreciated from the foregoing, the ad system manager 104 can serve publishers 106, such as content servers and search services. The manager 104 permits serving of ads targeted to documents served by content servers. For example, a network or inter-network may include an ad server serving targeted ads in response to requests from a search service with ad spots for sale. In one example, the inter-network is the World Wide Web. The search service can crawl much or all of the content. Some of this content will include ad spots (also referred to as "inventory") available. In one specific example, one or more content servers may include one or more documents. Documents may include web pages, email, content, embedded information (e.g., embedded media), meta-information and machine executable instructions, and ad spots available. The ads inserted into ad spots in a document can vary each time the document is served or, alternatively, can have a static association with a given document.

According some implementations, advertisements provided by the ad system manager 104 and published on one or more web pages by the publishers 106 can be displayed on one or more web page locations. For instance, an advertisement may be displayed at the top of a search results page and/or along the side of a search results page. Additionally, two or more advertisements may be displayed at the top and/or side of a search results page. In some implementations, the placement of an ad may depend on a bid for a keyword associated with the advertisement, as discussed below. In this manner, advertisers can pay more for the prominent placement of an ad on a web page to increase the likelihood that the advertisement will be successful (e.g., result in a user visit to the advertised web site). Other factors can be used to locate or select ads (e.g., ad quality metrics).

The location of advertisements placed by the ad system manager 104 on published pages can be stored by the ad system manager 104. Additionally, the ad system manager 104 can track additional information provided by the users 108, publishers 106, and/or advertisers 102 associated with keywords and/or advertisements. This information can include statistics identifying the number of visits that are made to an advertised web page resulting from the selection of a particular ad placed in a particular location on a web page, the number of web pages visited by a user on an advertised site, the revenue generated by a user visiting an advertised site after selection of an ad, and other statistics described in greater detail below.

The advertisers 102, user devices 108, and/or a search engine can also provide usage information to the ad system manager 104. This usage information can include measured or observed user behavior related to advertisements that have been served, such as, for example, whether or not a conversion or a selection related to an advertisement has occurred. The system 104 performs financial transactions, such as crediting the publishers 106 and charging the advertisers 102 based on the usage information. Such usage information can also be processed to measure performance metrics, such as a click-through rate ("CTR"), conversion rate, etc.

A click-through can occur, for example, when a user of a user device, selects or "clicks" on a link to a content item returned by the publisher or the advertising management system. The CTR is a performance metric that is obtained by dividing the number of clicks on the content item, e.g., a link to a landing page, an advertisement, or a search result, by the number of times the content item was delivered. For example, if a link to a content item is delivered 100 times, and the content item was clicked on 3 times, then the CTR for that content item is 3%. Other usage information and/or performance metrics can also be used.

A "conversion" occurs, for example, when a user consummates a transaction related to a previously served advertisement. What constitutes a conversion may vary from case to case and can be determined in a variety of ways. For example, a conversion may occur when a user clicks on an advertisement, is referred to the advertiser's webpage, and consummates a purchase there before leaving that webpage. A conversion can also be defined by an advertiser to be any measurable/observable user action such as, for example, downloading a white paper, navigating to at least a given depth of a Webpage, viewing at least a certain number of Webpages, spending at least a predetermined amount of time on a Webpage or Webpages, registering on a Webpage, etc. Other actions that constitute a conversion can also be used.

In addition to the advertisements being selected based on content such as a search query or webpage content of a publisher, the advertisements can also be selected from an auction. In one implementation, the ad system manager 104 includes an auction process. Advertisers 102 may be permitted to select, or bid, an amount the advertisers are willing to pay for each presentation, interaction or other action (e.g., click of an advertisement) associated with the presentation of an advertisement. The cost-per-click can include a maximum cost-per-click, e.g., the maximum amount the advertiser is willing to pay for each click of advertisement based on a keyword. For example, advertisers A, B, and C all select, or bid, a maximum cost-per-click of $0.50, $0.75, and $1.00, respectively. The maximum amount advertiser A will pay for a click is $0.50, the maximum amount advertiser B will pay is $0.75, and the maximum amount advertiser C will pay is $1.00.

The rank of an advertisement that is displayed can be determined by, for example, multiplying the maximum cost-per-click for the advertisement by a quality score of the advertisement. The advertisement can then be placed among other advertisements in order of increasing or decreasing rank. For example, suppose the quality score of advertisers A, B, and C are "3," "1," and "1," respectively. The rank of advertiser A, B, and C can be determined as follows:

A: Rank=quality score×maximum cost-per-click=3.0×$0.50=1.50

B: Rank=quality score×maximum cost-per-click=1.0×$0.75=0.75

C: Rank=quality score×maximum cost-per-click=1.0×$1.00=1.00

The advertisers can be ranked as follows:
1. A
2. C
3. B

An advertisement can also be associated with an actual cost-per-click. The actual cost-per-click of the advertisement can be determined by, for example, the maximum cost-per-click of the advertisement, quality score of the advertisement, and by the amount selected or bid by the advertiser directly below. In some implementations, the actual cost-per-click can be the price that is necessary to keep the advertisement's position above the next advertisement. For example, to determine the actual cost-per-click, the system 104 can determine how much the advertiser in position 1 would have to pay to give them a rank equal to the advertiser in position 2, and then the system 104 adds a unit amount, e.g., $0.01, to this determined amount.

In this example, to determine how much the advertiser in position 1 would have to pay to give them a rank equal to the advertiser in position 2, the rank of position 2 can be divided by the quality score of position 1 and $0.01 can be added to that amount. In this example, the last advertiser in the list can pay a minimum cost-per-click to hold the position in the list. For example, suppose the minimum cost-per-click is $0.20. The actual cost-per-click of advertisers A, B, and C can be determined as follows:

A: C's rank/A's quality score=1.0/3=$0.33+$0.01=$0.34

C: B's rank/C's quality score=0.75/1=$0.75+$0.01=$0.76

B: minimum cost-per-click=$0.20

In this example, advertiser A would only have to pay $0.34 to hold the first position in the list of advertisements. C would have to pay $0.76 to hold the second position. Advertiser B would be required to pay the minimum cost-per-click amount of $0.20. The advertisements, associated usage data, and bidding parameters described above can be stored as advertisement data in an advertisement data store. An advertiser 102 can further manage the serving of advertisements by specifying an advertising campaign. The advertising campaign can be stored in campaign data in an advertisement data store, which can, for example, specify advertising budgets for advertisements, when, where and under what conditions particular advertisements may be served for presentation, etc.

Figure 2:
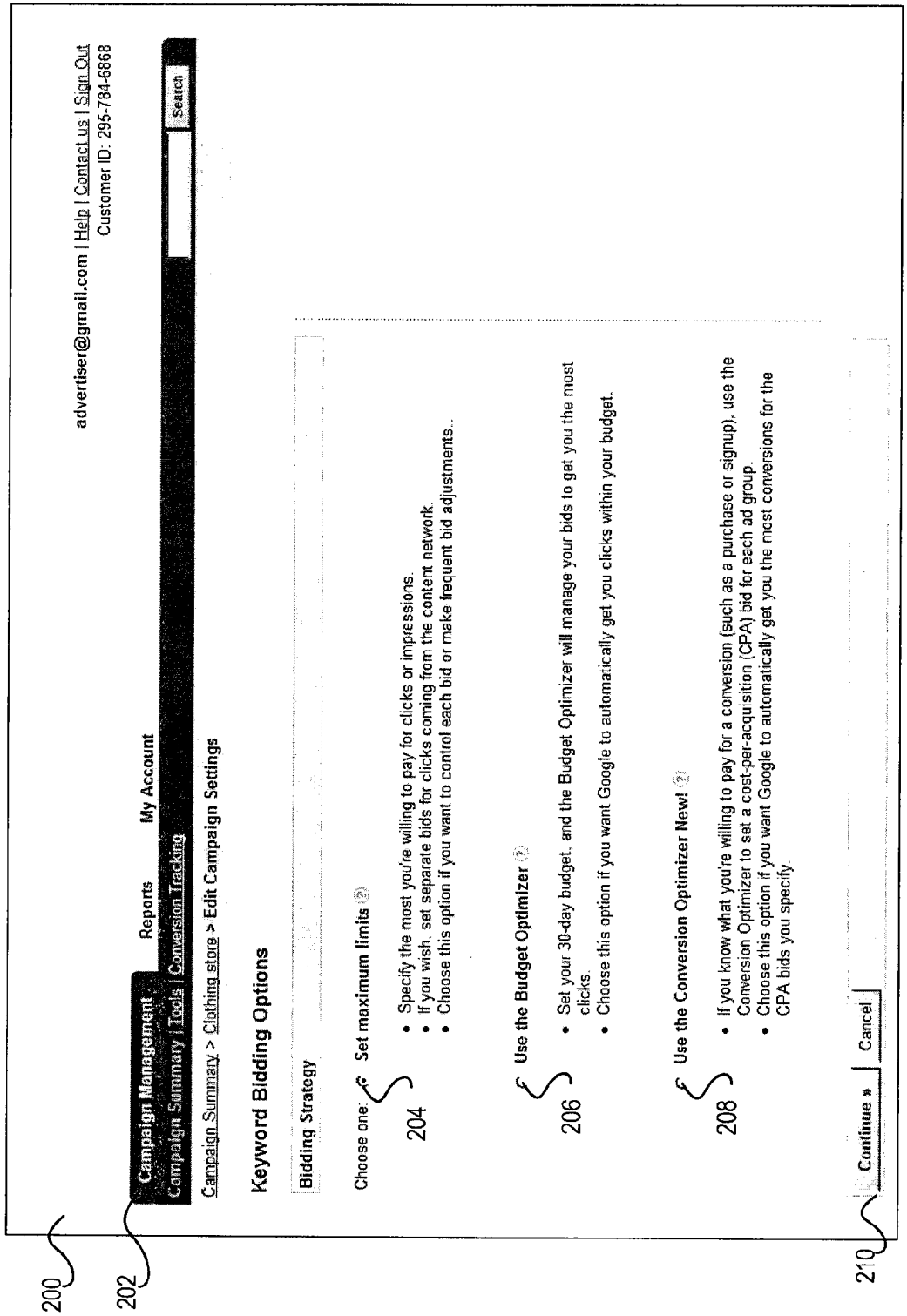
FIG. 2 illustrates an example of a user interface for specifying keyword bidding options.

FIG. 2 illustrates an example user interface 200 for specifying keyword bidding options. In some implementations, advertisers can interact with an online ad targeting service (e.g., the ad management system 104) through the user interface 200. In this particular implementation, the user interface 200 includes a campaign management tab 202 which presents several bidding strategy options that can be selected by the advertiser using a mouse or other input device.

A first option 204 allows the advertiser to specify a maximum monetary value the advertiser is willing to pay for an interaction (e.g., click or impression). The advertiser can choose the first option 204 to control each bid or make frequent bid adjustments. A second option 206 allows the advertiser to set a 30-day budget and to manage bids, e.g., to get the most clicks. The advertiser can choose the second option 206, for example, to automatically get clicks within the advertiser's budget. A third option 208 allows the advertiser to set a target bid (e.g., cost per action (CPA) target) for each of the advertiser's keywords/ad groups. The advertiser can choose the third option 208, for example, to automatically get the most conversions for the advertiser's target bid and to implement automated value-based bidding. As shown in FIG. 2, the user can select an option by first interacting with (e.g., clicking on) a bubble or other user interface element (e.g., a button), then selecting (e.g., clicking) a "Continue" button 210 to receive a new dialog.

Although the user interface 200 allows for specifying a CPA target, other target metrics are possible, such as Return-On-Advertising Spend (ROAS), Return-On-Investment (ROI) and any other appropriate metrics.

Figure 3:
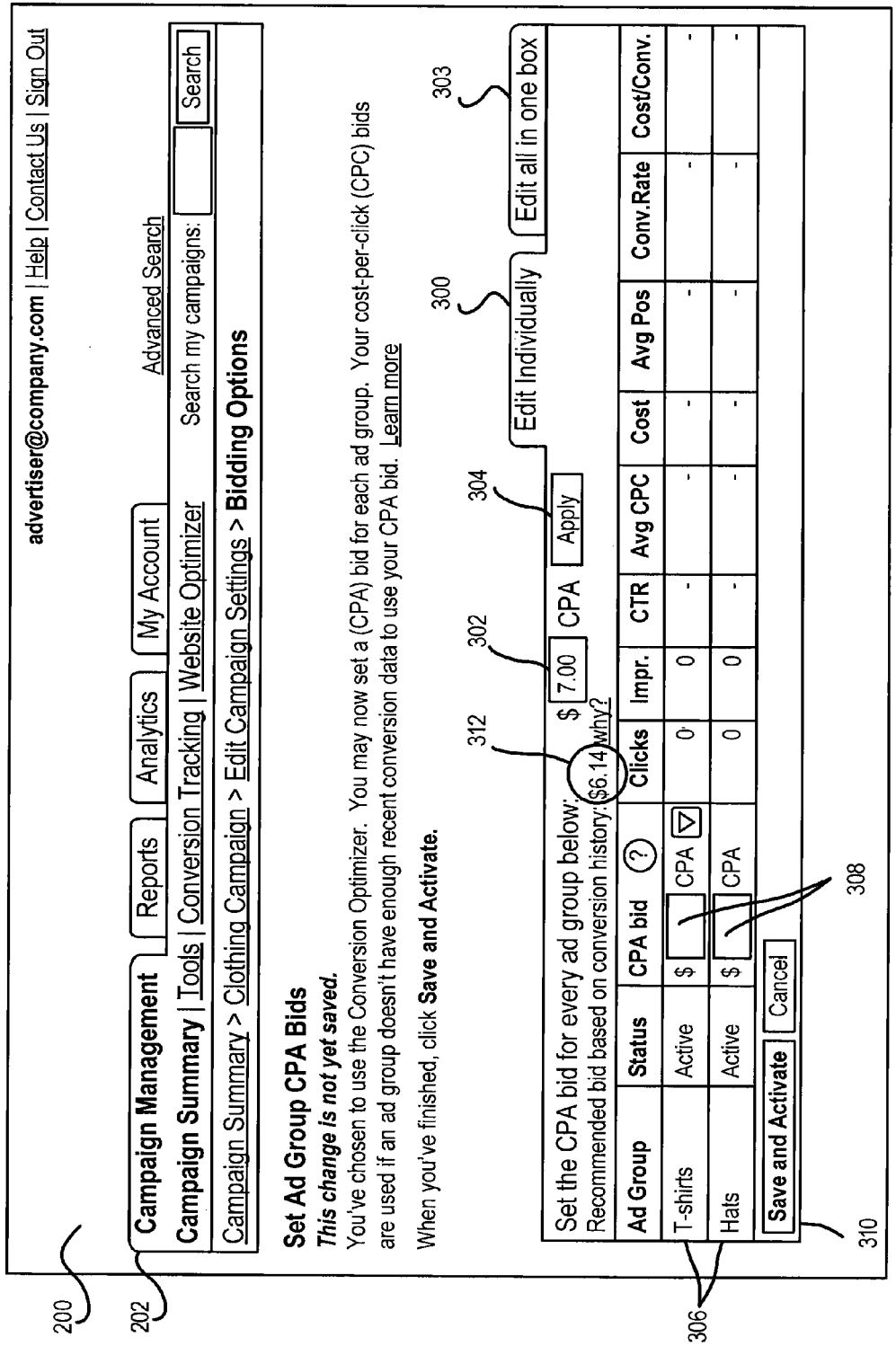
FIG. 3 illustrates an example of a user interface for entering cost per click for an ad group.

FIG. 3 illustrates an example of a user interface 300 configured for setting target bids. In the particular implementation shown in FIG. 3, ad groups are identified, where each ad group contains one or more ads targeting a single set of keywords. An advertiser can set the maximum price it wishes to pay for an ad group keyword list or for individual keywords within the ad group. In this illustrative example, an advertiser can select the maximum price it wishes to pay for an ad group.

The campaign management tab 202 presents a new dialog in response to the advertiser clicking/selecting the third option 208 and clicking the "Continue" button 210 in the previous dialog shown in FIG. 2. In some implementations, the new dialog includes two tabs: an "Edit Individually" tab 300 for allowing a user to edit ad groups individually and an "Edit all in one box" tab 303 for allowing the user to edit all ad groups with a single box. In the example shown, the "Edit Individually" tab 300 is selected by the advertiser. If an ad group has insufficient conversion data available to generate a meaningful prediction of its conversion rate, then a default Max CPC bid specified by the advertiser can be used.

The tab 300 allows the advertiser to set, for example, a CPA target for each of the advertiser's ad groups. According to some implementations, the system is operable to make predictions of CPA targets. Targets may be adjusted based on the predicted targets, or alternatively, a maximum value can be used. For example, if a user sets a max Cost Per Click (CPC) of $5, and the system predicts that the user will be successful with a bid of $4, then a $4 bid may be used/associated with the ad where this option is selected. Alternatively, a default maximum cost per click (Max CPC) bid specified by the advertiser can be used.

In the example shown, the advertiser has two active ad groups 306: T-shirts and Hats. At the top of the tab 300, a text box 302 is presented for allowing the user to input a single CPA target for all the advertiser's ad groups 306. In this example, the advertiser has specified a CPA bid of seven dollars. By selecting the Apply button 304 the seven dollar bid will be used for all the advertiser's ad groups 306. Alternatively, the advertiser can separately specify a different CPA bid for each ad group using, for example, text boxes 308. When the CPA is specified, the advertiser can select the Save and Activate button 310 to save the bids and activate the campaign. The remainder of the tab 300 is used to present campaign data, such as the number of clicks or impressions, click-through-rate (CTR), average CPC, cost, conversion rate, etc.

Of particular interest in the tab 300 is the presentation of a recommended CPA bid 312 for providing the advertiser with guidance in selecting a CPA bid. The recommended CPA bid, can in some implementations, be equivalent to the advertiser's current CPC bids. For example, if the advertiser currently has a CPC bid of $0.30 and a conversion rate of 5%, the recommended CPA bid would be $6.00 ($6.00*5%=$0.30). In practice the advertiser's current CPC bids will typically vary from ad to ad and from keyword to keyword for a single ad. In such cases, the recommended CPA bid can be computed using $$CPA = \frac{\sum_{i=1}^{N} MaxCPCbid_i}{\sum_{i=1}^{M} Conversions_i}, \quad (1)$$

where the numerator of [1] is the sum of N Max CPC bids over all the clicks that the advertiser received during a relevant period of time (e.g., over the past month), and the denominator of [1] is the total number of conversions M that resulted from these clicks.

It should be noted that the user interfaces 200 shown in FIGS. 2 and 3 are merely examples, and other user interfaces having more or fewer user interface elements, or different user interface elements, can be used to provide advertisers access to the functionality described herein.

Although the user interfaces 200 described with respect to FIGS. 2 and 3 permit a user (e.g., a publisher 106) to submit bids for ad groups, those interfaces 200 do not provide users with feedback that enables users to ascertain the value of differing actions, such as the value of an impression versus the value of a click.

Figure 4:
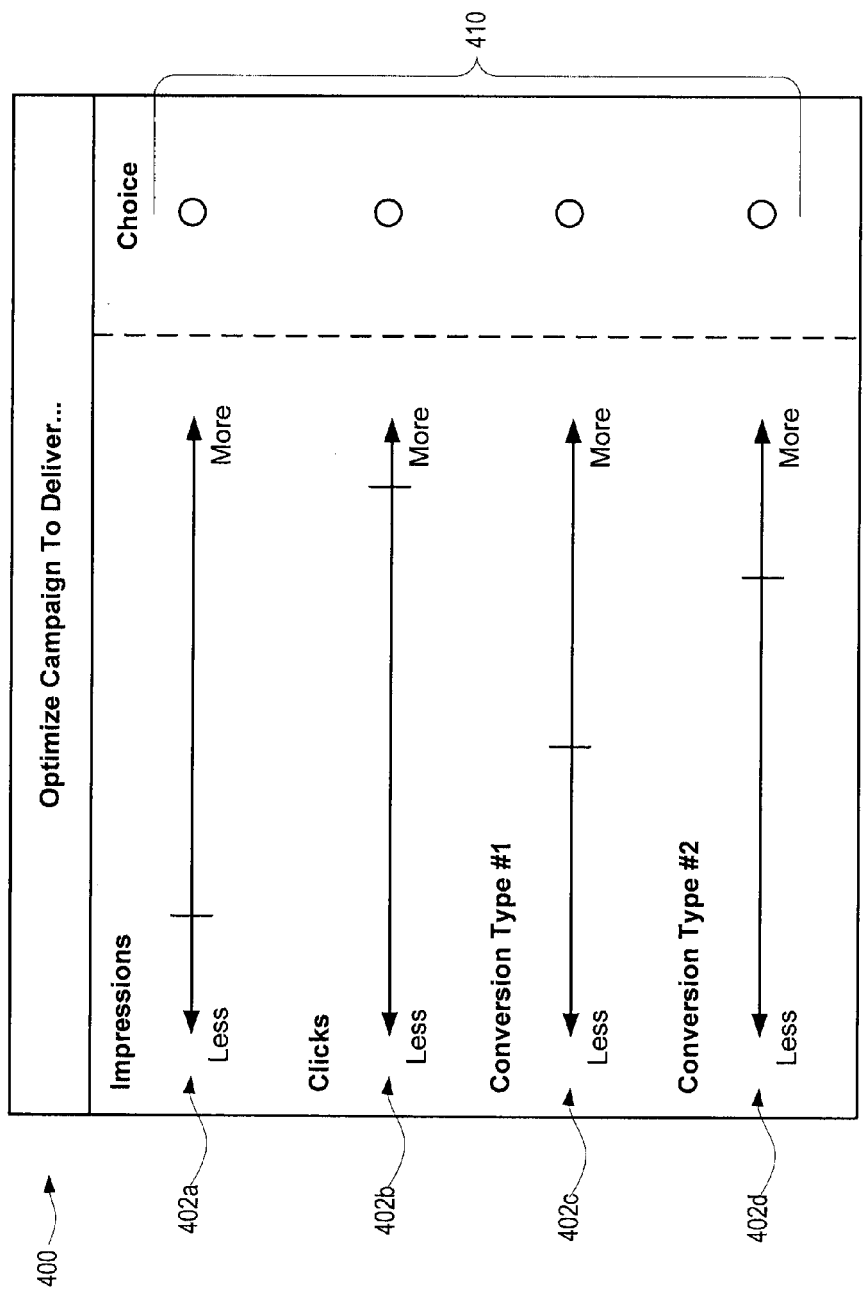
FIG. 4 illustrates an example campaign optimization interface.

FIG. 4 illustrates an example campaign optimization interface 400. According to some implementations, the campaign optimization interface 400 is implemented by the ad system manager 104 for use by users, e.g., publishers 106. The interface 400 permits a user to control advertising options and view how changes to advertising options impact the payment for placement of content items, e.g., advertisements. In particular, the interface 400 provides one or more user controls, such as slider tools 402a, 402b, 402c, 402d (collectively referred to as slider tools 402) that show the interrelation of advertising mechanisms such as impressions, clicks, and conversions. Other tools are possible, including different or similar tools for each conversion type.

A user can manipulate the slider tools 402 to view how adjustments to one or more advertising mechanisms impact the payment and placement of content items (e.g., ads) on one or more web pages. The interface can permit, e.g., an advertiser to modify bids for advertising placements, keywords, and/or advertisements to obtain a better return on investment.

To select one or more advertising mechanisms for adjustment, the user can toggle choice buttons (or toggle selections) 410 on the interface 400. According to some implementations, only a single choice button may be toggled (i.e., selected) at once. For instance, a user may select only a choice button that corresponds to the 'impressions' slider tool 402a. This will permit the user to modify the number of desired impressions to show the interaction between impressions and other mechanisms of value, as described with respect to FIG. 5. According to some implementations, two or more of the choice buttons may be selected simultaneously. This could occur, for instance, if two or more conversions are interrelated.

Figure 5:
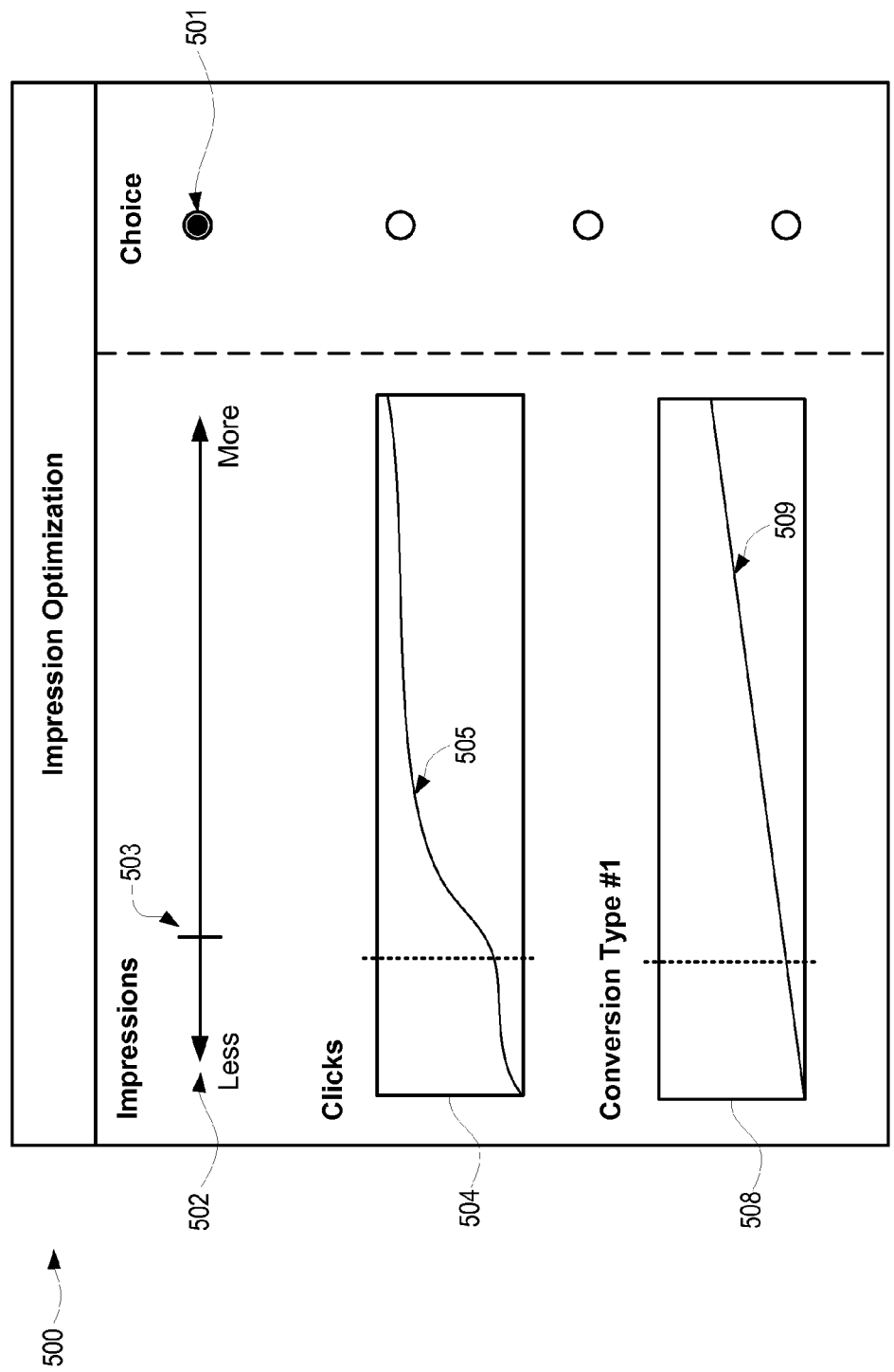
FIG. 5 illustrates an example impression optimization interface.

FIG. 5 illustrates an example impression optimization interface 500 after the choice button 501 is selected for impressions in the campaign optimization interface 400. The impressions slider tool 502 includes a slider bar 503 that can be dragged left and right by a user to signify that fewer (i.e., less) or more impressions are desired. Although not illustrated in the interface 500, a number of impressions may also be displayed that changes with the movement of the slider bar 503. In a default position, the slider bar could start at the center of the slider tool (e.g., a half-way point) with the total number of impressions displayed as the number of expected impressions for the user's current advertising campaign.

As the slider bar 503 is moved to the left or right, related advertising mechanisms are updated automatically. In the example interface 500 shown in FIG. 5, movement of the slider bar 503 results in the automatic updating of the yield curves 505, 509 within graphs 504, 508 corresponding, respectively, to clicks and conversion type #1.

The yield curves 505, 509 permit a user to view the relative weight, value, and priority of each type of ad mechanism (e.g., impressions, clicks, conversion) and to predict the incremental number of derivative actions that may occur at each point of future action. According to some implementations, the yield curves are calculated by the ad system manager 104 of FIG. 1.

Figure 6:
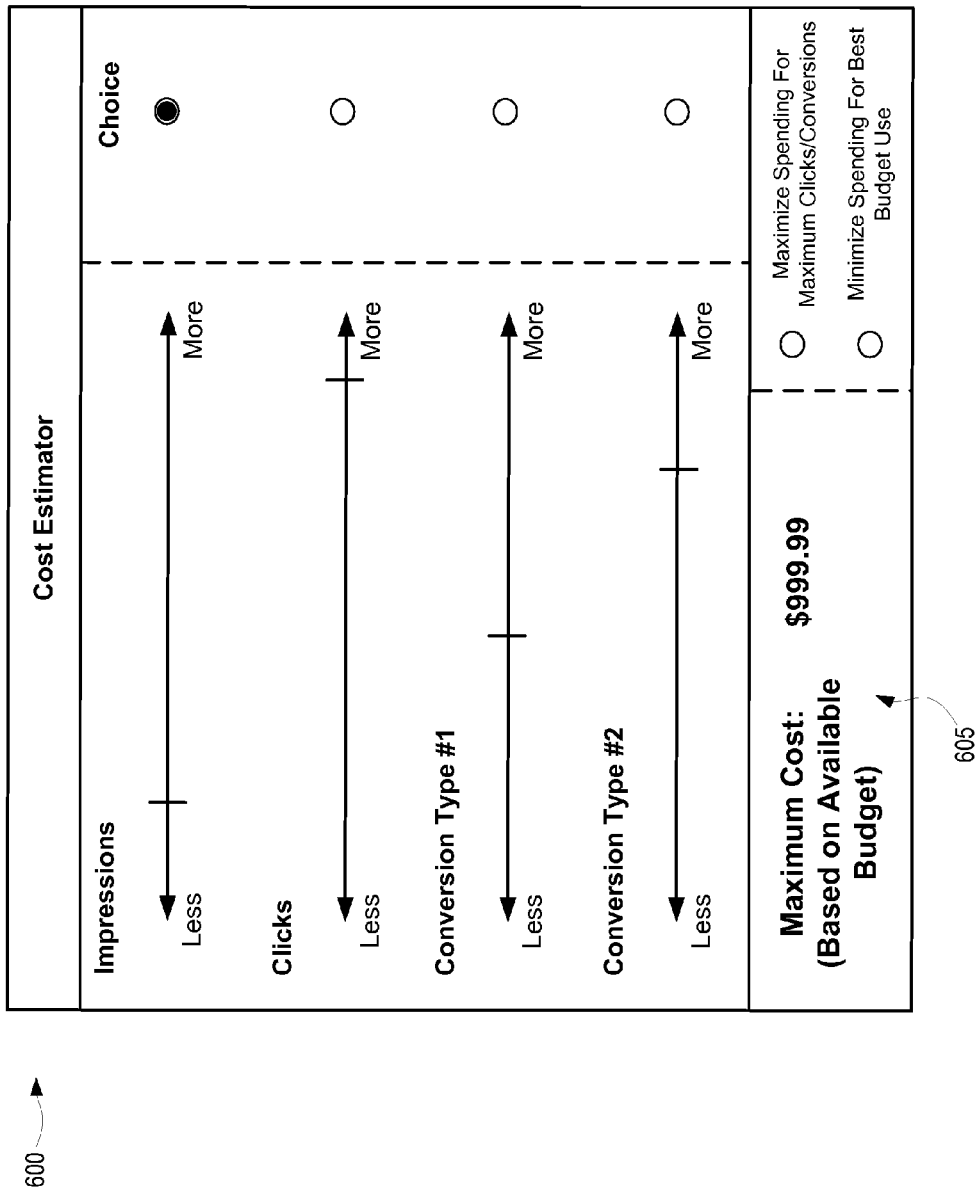
FIG. 6 illustrates an example cost estimator interface.

FIG. 6 illustrates an example cost estimator interface 600. The cost estimator interface 600 permits a user, such as a publisher 106, to view the cost impact of modifying one or more advertising mechanisms or minimizing overall costs (i.e., spending for an ad campaign). The interface 600 includes a cost estimate 605 that identifies the maximum cost to satisfy a user-selected ad mechanism.

Figure 7:
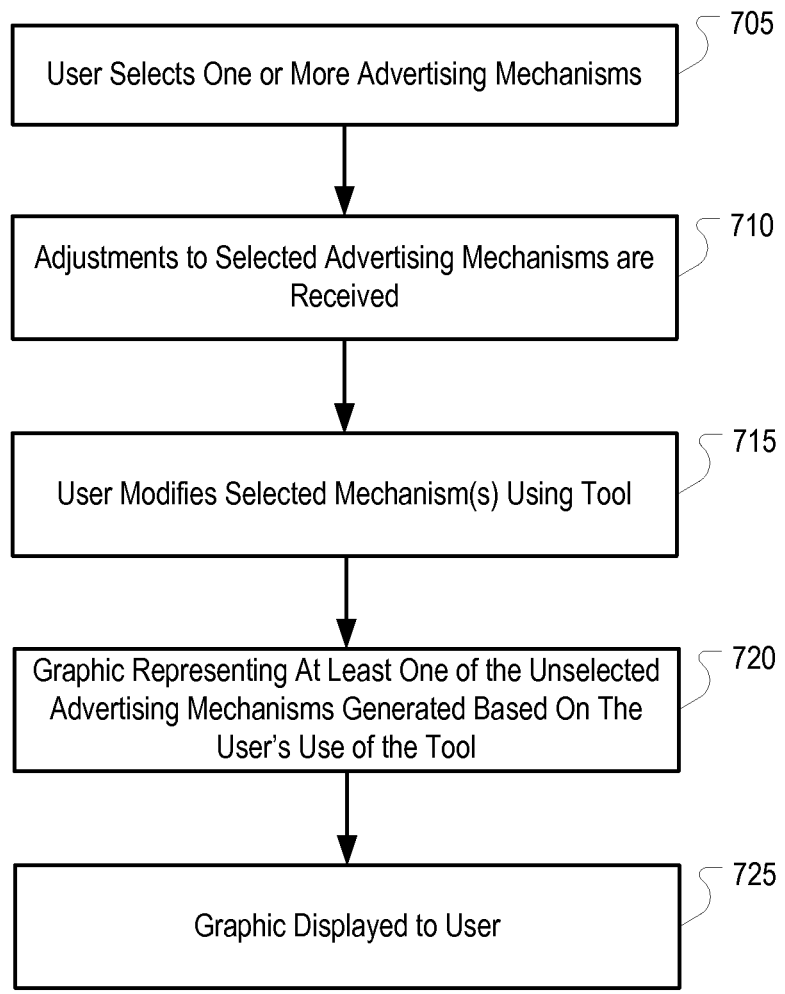
FIG. 7 is a flow diagram of an example process for advertising impression optimization.

FIG. 7 is a flow diagram of an example process 700 for advertising impression optimization that may be performed, for example, by a system such as the system 100 and, for clarity of presentation, the description that follows uses the system 100 as the basis of an example for describing the process 700. However, another system, or combination of systems, may be used to perform the process 700.

At stage 705, a user selects one or more advertising mechanisms from a list of advertising mechanisms. For instance, a user could select advertising 'impressions'. Next, at stage 710, adjustments to one or more user selected advertising mechanisms can be received For example a user can be presented with a user configurable tool (e.g., a slide tool) corresponding with the one or more user-selected advertising mechanisms. At stage 715, the user can use the tool to modify the user-selected advertising mechanism(s). For instance, the user could modify the 'impressions' by moving a slider bar within an impressions slide tool to increase or decrease the desired number of impressions. At stage 720 a graphic representing at least one of the unselected advertising mechanisms is generated, based at least in part on an adjustment of the at least one user-adjustable advertising mechanism by the user using the user-adjustable tool. The graphic can be displayed to the user at stage 725. Optionally, using the graphic the user can modify one or more of the advertising mechanisms to implement an advertising program or scheme. According to some implementations, each of the above stages can be implemented using the ad system manager 104 of FIG. 1.

Although described herein with respect to slide tools, other visual methods could also be employed to show relative weight, value, and priority of advertising mechanisms.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   facilitating, by one or more processors, two or more first graphical presentations that represent a plurality of user-adjustable advertising mechanisms;
   receiving an indication of a user selection of at least one of the plurality of user-adjustable advertising mechanisms;
   facilitating, in response to the indication of the user selection, a presentation of a user-adjustable tool, the user-adjustable tool operable to receive user input to adjust at least one value of the selected user-adjustable advertising mechanisms;
   receiving an indication of user input indicating the value of the selected user-adjustable advertising mechanisms; and
   in response to the received value of the selected user-adjustable advertising mechanisms, facilitating, by the one or more processors, one or more second graphical presentations that represent one or more non-selected user-adjustable advertising mechanisms of the plurality of user-adjustable advertising mechanisms, the one or more second graphical presentations that represent the one or more non-selected user-adjustable advertising mechanisms being dependent on the received value of the selected user-adjustable advertising mechanisms, wherein the one or more second graphical presentations differ from the two or more first graphical presentations.

2. The method of claim 1, wherein the user-adjustable tool comprises a slider tool.

3. The method of claim 1, wherein the plurality of user-adjustable advertising mechanisms comprise advertising impressions or advertising clicks.

4. The method of claim 1, wherein facilitating the one or more second graphical presentations that represent the one or more non-selected user-adjustable advertising mechanisms comprises generating at least one graph associated with the one or more non-selected user-adjustable advertising mechanisms.

5. The method of claim 4, wherein the at least one graph comprises a yield curve.

6. The method of claim 1, further comprising displaying a cost associated with the selected user-adjustable advertising mechanisms.

7. The method of claim 1, wherein the plurality of user-adjustable advertising mechanisms comprise conversions.

8. The method of claim 4, further comprising displaying the at least one graph on a display associated with the user.

9. A system, comprising:
   one or more computers; and a computer-readable medium coupled to the one or more computers having instructions stored thereon which, when executed by the one or more computers, cause the one or more computers to perform operations comprising:

facilitating two or more first graphical presentations that represent a plurality of user-adjustable advertising mechanisms;

receiving an indication of a user selection of at least one of the plurality of user-adjustable advertising mechanisms;

facilitating, in response to the indication of the user selection, a presentation of a user-adjustable tool, the user-adjustable tool operable to receive user input to adjust at least one value of the selected user-adjustable advertising mechanisms;

receiving an indication of user input indicating a value of the selected user-adjustable advertising mechanism; and in response to the received value of the selected user-adjustable advertising mechanism, facilitating one or more second graphical presentations that represent one or more non-selected user-adjustable advertising mechanisms of the plurality of user-adjustable advertising mechanisms, the one or more second graphical presentations that represent the one or more non-selected user-adjustable advertising mechanism being dependent on the received value of the selected user-adjustable advertising mechanisms, wherein the one or more second graphical presentations differ from the two or more first graphical presentations.

10. The system of claim 9, wherein the user-adjustable tool comprises a slider tool.

11. The system of claim 9, wherein the plurality of user-adjustable advertising mechanisms comprise advertising impressions or advertising clicks.

12. The system of claim 9, wherein the operation of facilitating the one or more second graphical presentations that represent the one or more non-selected user-adjustable advertising mechanisms comprises generating at least one graph associated with the non-selected user-adjustable advertising mechanisms.

13. The system of claim 12, wherein the at least one graph comprises a yield curve.

14. The system of claim 9, wherein the operations further comprise displaying a cost associated with the selected user-adjustable advertising mechanisms.

15. The system of claim 9, wherein the plurality of user-adjustable advertising mechanisms comprise conversions.

16. The system of claim 12, wherein the operations further comprise displaying the at least one graph on a display associated with the user.

* * * * *

UNITED STATES PATENT AND TRADEMARK OFFICE
CERTIFICATE OF CORRECTION

| | | |
|---|---|---|
| PATENT NO. | : 8,799,078 B1 | Page 1 of 1 |
| APPLICATION NO. | : 12/607517 | |
| DATED | : August 5, 2014 | |
| INVENTOR(S) | : Kniaz | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 646 days.

Signed and Sealed this
Fifteenth Day of September, 2015

Michelle K. Lee
*Director of the United States Patent and Trademark Office*